(12) United States Patent
Jang

(10) Patent No.: US 12,506,978 B2
(45) Date of Patent: Dec. 23, 2025

(54) IMAGE SIGNAL PROCESSOR AND PROCESSING METHOD CAPABLE OF DETERMINING DIRECTIONALITY STRENGTH INFORMATION

(71) Applicant: SK hynix Inc., Icheon-si (KR)

(72) Inventor: Cheol Jon Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 261 days.

(21) Appl. No.: 18/357,425

(22) Filed: Jul. 24, 2023

(65) Prior Publication Data

US 2024/0314459 A1 Sep. 19, 2024

(30) Foreign Application Priority Data

Mar. 15, 2023 (KR) .................. 10-2023-0033706

(51) Int. Cl.
*H04N 25/46* (2023.01)
(52) U.S. Cl.
CPC .................. *H04N 25/46* (2023.01)
(58) Field of Classification Search
CPC ..... H04N 25/134; H04N 25/46; H04N 25/704
See application file for complete search history.

(56) References Cited

U.S. PATENT DOCUMENTS

| 9,826,174 | B2 | 11/2017 | Choi | |
|---|---|---|---|---|
| 11,589,035 | B1* | 2/2023 | Lin | ............... H04N 17/002 |
| 2010/0026862 | A1* | 2/2010 | Nishiwaki | ............ H04N 25/683 |
| | | | | 348/246 |
| 2012/0320241 | A1* | 12/2012 | Sugawara | .............. H04N 25/68 |
| | | | | 348/246 |
| 2013/0051665 | A1* | 2/2013 | Shinozaki | ................. G06T 5/77 |
| | | | | 382/167 |
| 2015/0070536 | A1* | 3/2015 | Sasaki | ..................... H04N 25/61 |
| | | | | 348/246 |
| 2021/0096089 | A1* | 4/2021 | Shimizu | ............... G01N 23/046 |
| 2022/0102413 | A1* | 3/2022 | Cho | ....................... H04N 25/704 |
| 2024/0267635 | A1* | 8/2024 | Jang | ........................ G06T 3/403 |
| 2024/0320852 | A1* | 9/2024 | Jang | ......................... G06T 5/00 |

FOREIGN PATENT DOCUMENTS

KR 101327790 B1 11/2013

* cited by examiner

*Primary Examiner* — Antoinette T Spinks
(74) *Attorney, Agent, or Firm* — WILLIAM PARK AND ASSOCIATES LTD.

(57) ABSTRACT

An image signal processor capable of performing image processing and a method for processing an image signal are disclosed. The image signal processor includes an image binning circuit configured to generate a second image by summing pixel values of color pixels in a first image including a pixel value of at least one phase detection pixel and the pixel values of the color pixels, a directionality strength determiner configured to calculate directionality strength information based on a target pixel disposed at a center of a target kernel within the target kernel of the second image, a pixel value comparator configured to compare the pixel value of the target pixel with pixel values of neighboring homogeneous pixels, a correction value generator configured to generate a correction value for correcting the target pixel, and a corrector configured to correct the target pixel.

18 Claims, 6 Drawing Sheets

IMAGE SIGNAL PROCESSOR AND PROCESSING METHOD CAPABLE OF DETERMINING DIRECTIONALITY STRENGTH INFORMATION

CROSS-REFERENCE TO RELATED APPLICATION

This patent application claims priority under 35 U.S.C. § 119(a) to Korean patent application No. 10-2023-0033706, filed on Mar. 15, 2023, in the Korean Intellectual Property Office, which is hereby incorporated by reference in its entirety as part of the disclosure of this patent document.

BACKGROUND

1. Technical Field

The technology and implementations disclosed in this patent document generally relate to an image signal processor and, more particularly, an image signal processor capable of performing image processing and an image signal processing method using the image signal processor.

2. Related Art

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IOT (Internet of Things), robots, security cameras and medical micro cameras.

A pixel array that directly captures an optical image in an image sensing device may include defective pixels that cannot normally acquire a color image due to process errors. In order to implement an autofocus function, phase difference detection pixel(s) may be included in the pixel array. The phase difference detection pixels capable of acquiring phase-difference related information cannot acquire color images in the same manner as defective pixels, such that the phase difference detection pixels can be treated as defective pixels from the point of view of color images.

As a process for the pixel array is advanced and the autofocus function becomes more important, the ratio of defective pixels or phase difference detection pixels included in the pixel array is increasing, and the accuracy of correction for the detective pixels or the phase difference detection pixels is being highlighted as an important factor in determining the quality of images.

SUMMARY

In accordance with an embodiment of the disclosed technology, an image signal processor may include an image binning circuit configured to generate a second image by summing pixel values of color pixels in a first image including a pixel value of at least one phase detection pixel and the pixel values of the color pixels; a directionality strength determiner configured to calculate directionality strength information based on a target pixel disposed at a center of a target kernel within the target kernel of the second image; a pixel value comparator configured to compare the pixel value of the target pixel with pixel values of neighboring homogeneous pixels; a correction value generator configured to generate a correction value for correcting the target pixel based on a result of calculating the directionality strength and a result compared by the pixel value comparator; and a corrector configured to correct the target pixel based on the correction value.

In accordance with another embodiment of the disclosed technology, an image signal processing method may include generating a target pixel by binning color pixels that are obtained by excluding at least one phase difference detection pixel from a sub-pixel array including the phase difference detection pixel and the color pixels; determining directionality strength information based on the target pixel located at a center of a target kernel; comparing the pixel value of the target pixel with pixel values of neighboring homogeneous pixels; and correcting the target pixel, when the directionality strength has specific directionality and a difference in pixel value between the target pixel and the neighboring homogeneous pixels is equal to or greater than the threshold.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
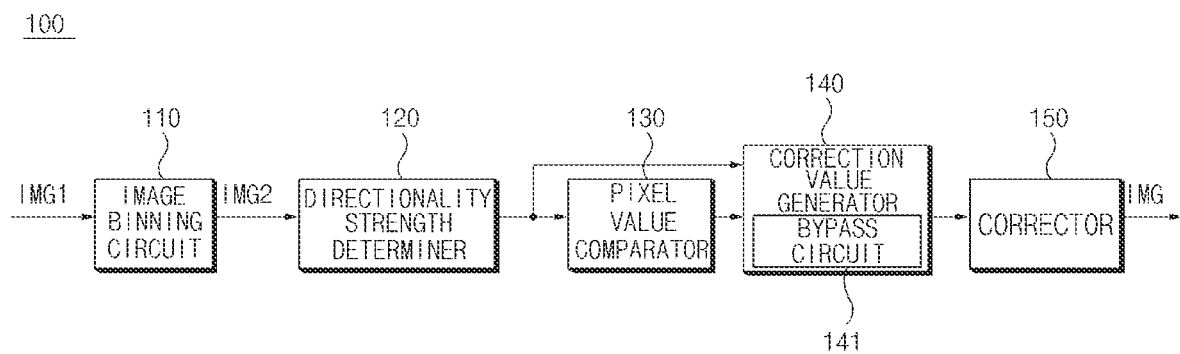
FIG. 1 is a block diagram illustrating an example of an image signal processor based on some implementations of the disclosed technology.

This patent document provides implementations and examples of an image signal processor and a method for processing an image signal that may be used in configurations to substantially address one or more technical or engineering issues and to mitigate limitations or disadvantages encountered in some other image signal processors. Some embodiments of the disclosed technology relate to an image signal processor for determining whether binned target pixels except for phase difference detection pixels in a pixel binning mode in which binning of pixels other than the phase difference detection pixels is performed is located in a region having a specific directionality, selectively correcting the target pixels based on the result of determination, and thus preventing or mitigating false colors from occurring in a high-frequency region, and an image signal processing method for the same. In recognition of the issues above, an embodiment of the disclosed technology can prevent or mitigate false colors from occurring in a high-frequency region, and can increase the accuracy of correction of defective pixels or the like.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

A pixel array of the image sensing device may include defective pixels which are unable to normally capture a color image due to fabrication limitations or temporary noise inflow. Also, the pixel array may include phase difference detection pixels for obtaining phase-difference related information to implement an autofocus function. Since the phase difference detection pixel is unable to obtain a color image like a defective pixel, the phase difference detection pixel can be treated as a defective pixel from the point of view of a color image. In order to increase the quality of a color image, it is essential to increase the accuracy of correcting defective pixels.

Various embodiments of the disclosed technology relate to an image signal processor for determining whether binned target pixels except for phase difference detection pixels in a pixel binning mode in which binning of pixels other than the phase difference detection pixels is performed is located in a region having a specific directionality, selectively correcting the target pixels based on the result of determination, and thus preventing false colors from occurring in a high-frequency region, and an image signal processing method for the same.

FIG. 1 is a block diagram illustrating an example of an image signal processor 100 based on some implementations of the disclosed technology.

Referring to FIG. 1, the image signal processor 100 based on some embodiments of the disclosed technology may include an image binning circuit 110, a directionality strength determiner 120, a pixel value comparator 130, a correction value generator 140, and a corrector 150.

The image binning circuit 110 may output a second image (IMG2) by binning a first image (IMG1). For example, image binning may refer to an operation of generating a downscaled image by summing pixel values output from pixels corresponding to an image. Here, the second image (IMG2) may be a downscaled image obtained by summing pixel values of the first image (IMG1). The image binning circuit 110 may generate the second image (IMG2) by summing only pixel values of the remaining color pixels except for phase difference detection (phase detection autofocus; PDAF) pixels from among pixels corresponding to the first image (IMG1).

The directionality strength determiner 120 may determine whether a direction having strong directionality strength exists by calculating directionality strength information of a target kernel based on the second image (IMG2). In some implementations of the disclosed technology, the directionality strength may be calculated based on information about a gradient sum. The gradient sum information may be a value that is obtained by summing differences between pixel data values of pixel pairs arranged in a specific direction within a target kernel.

In this case, the target kernel may include a target pixel to be corrected, and may refer to a unit for image signal processing. Also, the target pixel may refer to a pixel to be corrected. Although a sub-pixel array corresponding to the first image (IMG1) includes one or more phase difference detection pixels, the target pixel based on some implementations of the disclosed technology may refer to a pixel obtained by binning only the remaining color pixels other than the phase difference detection pixels in the second image (IMG2) after binning the first image (IMG1).

The pixel value comparator 130 may compare a pixel value of a target pixel included in the target kernel with pixel values of neighboring pixels (hereinafter referred to as "neighboring homogeneous pixels") of the same type as the target pixel based on the directionality strength information received from the directionality strength determiner 120. The neighboring pixels may refer to a pixel located adjacent to a periphery of the target pixel. That is, the pixel value comparator 130 may determine whether a difference between a pixel value of a target pixel and pixel values of neighboring pixels of the same type is equal to or greater than or less than a threshold. Here, the threshold may be set as a fixed value or may be set based on a specific ratio of the target pixel. For example, the pixel value comparator 130 may compare a pixel value of a target pixel with pixel values of neighboring pixels of the same type as the target pixel when there is no strong directionality based on the directionality strength information.

Also, the correction value generator 140 may generate correction values for selectively correcting the target pixel based on the output of the directionality strength determiner 120 and the output of the pixel value comparator 130. For example, the correction value generator 140 may determine correction values for correcting the target pixel, when the target kernel has strong directionality determined based on the directionality strength information and the result of comparison from the pixel value comparator 130 indicates that a difference in pixel value between the target pixel and the neighbor homogeneous pixels is equal to or greater than a threshold.

For example, the correction value generator 140 may generate a correction value by calculating an average pixel value of neighboring homogeneous color pixels included in the target kernel. In another example, the correction value generator 140 may generate a correction value by calculating a median value of neighboring homogeneous color pixels included in the target kernel. In still another example, the correction value generator 140 may generate a correction value by calculating an average pixel value of neighboring homogeneous color pixels arranged in a corresponding direction according to directionality within the target kernel.

In addition, the correction value generator 140 may include a bypass circuit 141. The bypass circuit 141 may bypass a pixel value of the target pixel based on the output signal of the pixel value comparator 130. For example, when the result of comparison from the pixel value comparator 130 indicates that a difference in pixel value between the target pixel and the neighboring homogeneous pixels is less than a threshold, the bypass circuit 141 may output the pixel value of the target pixel to the corrector 150 without generating a correction value for the target pixel.

The corrector 150 may correct the pixel value of the target pixel based on the correction value determined by the correction value generator 140, and may output an image (IMG) in which pixel values of pixels are corrected. The corrector 150 may compensate the target pixel using an average pixel value of neighboring homogeneous color pixels included in the target kernel. In another example, the corrector 150 may compensate the target pixel using a median value of neighboring homogeneous color pixels included in the target kernel. In still another example, the corrector 150 may compensate the target pixel using an average pixel value of neighboring homogeneous color pixels arranged in a corresponding direction according to directionality within the target kernel.

Operations of the image binning circuit 110, the directionality strength determiner 120, the pixel value comparator 130, the correction value generator 140, and the corrector 150 described above will be described in below with reference to FIGS. 3 to 6 to be described later.

Figure 2:
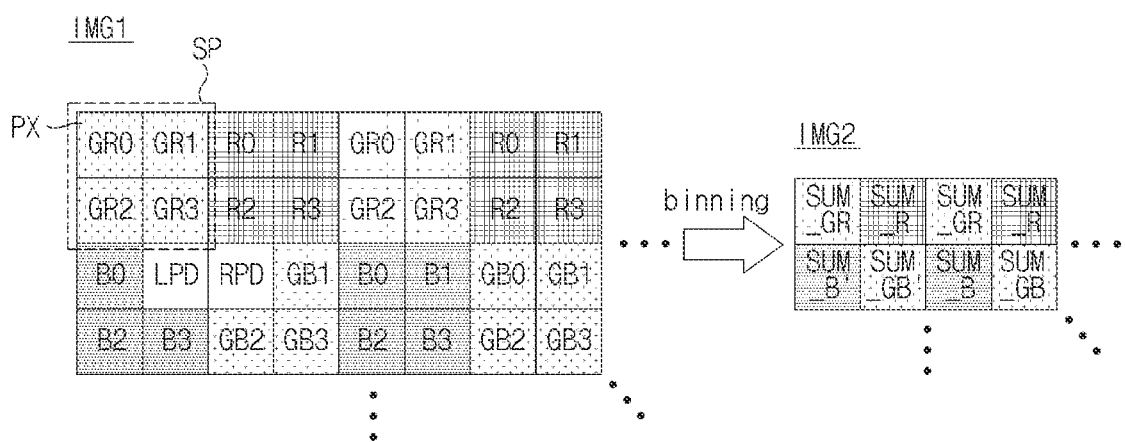
FIG. 2 is a schematic diagram illustrating an example of a binning mode of a pixel including phase difference detection pixels based on some implementations of the disclosed technology.

FIG. 2 is a schematic diagram illustrating an example of a binning mode of a pixel including phase difference detection pixels based on some implementations of the disclosed technology.

Referring to FIG. 2, the first image (IMG1) to be input to the image binning circuit 110 may be an image having a quad pattern. Here, the quad pattern may refer to a pattern in which unit pixels (PXs) of the same color are arranged in a (2×2) matrix composed of four unit pixels.

Although the embodiment of the disclosed technology has disclosed that the first image 1 (IMG1) is a kernel having a quad-Bayer pattern for convenience of description, the technical idea of the disclosed technology can also be applied to another kernel in which color pixels are arranged in other patterns such as a nona-Bayer pattern, a hexa-Bayer pattern, an RGBW pattern, a mono pattern, etc., the types of image patterns are not limited thereto and can also be sufficiently changed as needed.

In addition, the second image (IMG2) generated by the image binning circuit 100 may be a downscaled image generated by binning the first image (IMG1). Here, 'binning' may mean summation of pixel values of the unit pixels (PXs) having the same color on a sub-pixel array (SP) basis. That is, the image binning unit 110 may generate the second image (IMG2) by summing pixel values of the first image (IMG1). For example, the image binning circuit 110 may sum (e.g., 4-summation) the pixel values of the unit pixels (PXs) having the same color in the first image (IMG1) in units of four (2×2) pixel values (i.e., on a sub-pixel array (SP) basis), resulting in formation of the second image (IMG2).

In some implementations, although the embodiment of the disclosed technology has disclosed that the second image (IMG2) is an image obtained by summing the first image (IMG1) in units of four pixels, the summation unit of such images is not limited thereto, and can also be changed to another number of images as needed.

The binning mode of a pixel may be used for various purposes, such as, in an embodiment, to increase a frame rate or to improve brightness (luminance) in a low-illuminance environment. The first image IMG1 may include defective pixels (e.g., LPD and RPD) that do not maintain linear characteristics with neighboring pixels. That is, the defective pixels included in the first image IMG1 may refer to a pair of phase difference detection pixels (LPD, RPD) adjacent to each other. One pair of phase difference detection pixels (RPD, LPD) may be arranged instead of the color pixels at some positions from among positions where the color pixels are arranged. In this case, the left phase difference detection pixel (LPD) may be located in a sub-pixel array having a blue color, and the right phase difference detection pixel (RPD) may be located in a sub-pixel array having a green color. In other words, one pair of phase difference detection pixels (LPD, RPD) may be arranged across different sub-pixel arrays having different colors. However, although one pair of phase difference detection pixels LPD and RPD is arranged across different heterogeneous color regions, the pair of phase difference detection pixels LPD and RPD may include color filters of the same color. For example, the pair of phase difference detection pixels LPD and RPD may include a green color filter or a white color filter. However, this is merely an example and other implementations are also possible.

In some implementations of the disclosed technology, although the phase difference detection pixels LPD and RPD are shown as being disposed adjacent to each other, other implementations are also possible, and it should be noted that the phase difference detection pixels LPD and RPD may be arranged at random positions in various patterns. In addition, although the pair of phase difference detection pixels RPD and LPD is illustrated as being arranged across a sub-pixel array having a green color and a sub-pixel array having a blue color for convenience of description, other implementations are also possible, and it should be noted that such pixel color can also be sufficiently changed as needed without departing from the scope of the disclosed technology.

In a pixel binning mode, the phase difference detection pixels LPD and RPD may be included in the image, so that the pixel binning mode for the image may be performed. However, when the phase difference detection pixels LPD and RPD are mixed with the image, the output image may have a distorted output value. When the number of the phase difference detection pixels LPD and RPD increases, a technique for correcting an image in which the phase difference detection pixels LPD and RPD are mixed becomes complicated and more difficult. Therefore, in order to prevent or mitigate this problem, in an embodiment, the pixel binning mode may also be performed by excluding the phase difference detection pixels LPD and RPD from the image. Alternatively, when the pixel binning mode is performed without mixing the phase difference detection pixels LPD and RPD with the image, pixel values of the phase difference detection pixels LPD and RPD may be separately stored and then used only during the phase detection operation.

For example, when the pixel binning mode is performed in a situation where the image includes the phase difference detection pixels LPD and RPD, the pixel values of the phase difference detection pixels LPD and RPD may be summed as follows. A pixel value of a binned GR pixel (SUM_GR) may be a value obtained by summing pixel values of the corresponding pixels GR0, GR1, GR2, and GR3. A pixel value of a binned R pixel (SUM_R) may be a value obtained by summing pixel values of the corresponding pixels R0, R1, R2, and R3. A pixel value of a binned B pixel (SUM_B) may be a value obtained by summing pixel values of the corresponding pixels B0, B1, B2, and B3. A pixel value of a binned GB pixel (SUM_GB) may be a value obtained by summing pixel values of the corresponding pixels GB0, GB1, GB2, and GB3. A pixel value of a binned B' pixel (SUM_B') may be a value obtained by summing pixel values of the corresponding pixels B0, B1, B2, and LPD. A pixel value of a binned GB' pixel (SUM_GB') may be a value obtained by summing pixel values of the corresponding pixels GB0, GB1, GB2, and RPD.

On the other hand, when the pixel binning mode is performed by excluding the phase difference detection pixels (LPD, RPD) from the image, the pixel values of the phase difference detection pixels LPD and RPD may be summed as follows. A pixel value of a binned GR pixel (SUM_GR) may be a value obtained by summing pixel values of the corresponding pixels GR0, GR1, GR2, and GR3. A pixel value of a binned R pixel (SUM_R) may be a value obtained by summing pixel values of the corresponding pixels R0, R1, R2, and R3. A pixel value of a binned B pixel (SUM_B) may be a value obtained by summing pixel values of the corresponding pixels B0, B1, B2, and B3. A pixel value of a binned GB pixel (SUM_GB) may be a value obtained by summing pixel values of the corresponding pixels GB0, GB1, GB2, and GB3. A pixel value of a binned B' pixel (SUM_B') may be a value obtained by calculating an average pixel value of three pixels (B0, B2, B3) other than the LPD pixel from among the corresponding pixels (B0, LPD, B2, B3) and then multiplying the calculated average pixel value by a predetermined coefficient '4'. A pixel value of a binned GB' pixel (SUM_GB') may be a value obtained by calculating an average pixel value of three pixels (GB1, GB2, GB3) other than the RPD pixel from among the corresponding pixels (RPD, GB1, GB2, GB3) and then multiplying the calculated average pixel value by a predetermined coefficient '4'. The word "predetermined" as used herein with respect to a parameter, such as a predetermined coefficient or predetermined threshold, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

That is, in the pixel binning mode in which binning is performed without including the phase difference detection pixels (LPD, RPD) in the image, an image may be generated by mixing pixel values of the remaining color pixels except for the phase difference detection pixels (LPD, RPD). In other words, when the phase difference detection pixel LPD or RPD is included in the sub-pixel array SP in a situation where the unit pixels (PXs) are summed in units of four pixels (i.e., 4-summation), such summation may be performed in a situation where the phase difference detection pixel LPD or RPD is excluded from the sub-pixel array (SP).

However, since this binning mode cannot use all pixels in the sub-pixel array (SP) (except for the phase difference detection pixel), false color(s) (e.g., denoted by serrations) may occur in the image when a target pixel excluding one pixel is disposed in an edge region having a high frequency (particularly, specific directionality).

In some embodiments of the disclosed technology, in the pixel binning mode in which binning is performed without including the phase difference detection pixels (LPD, RPD), the image signal processor may determine whether the target pixel is located in the edge region having specific directionality and may selectively correct the target pixel based on the result of determination, so that false colors can be prevented or mitigated from occurring in the binning mode.

Figure 3:
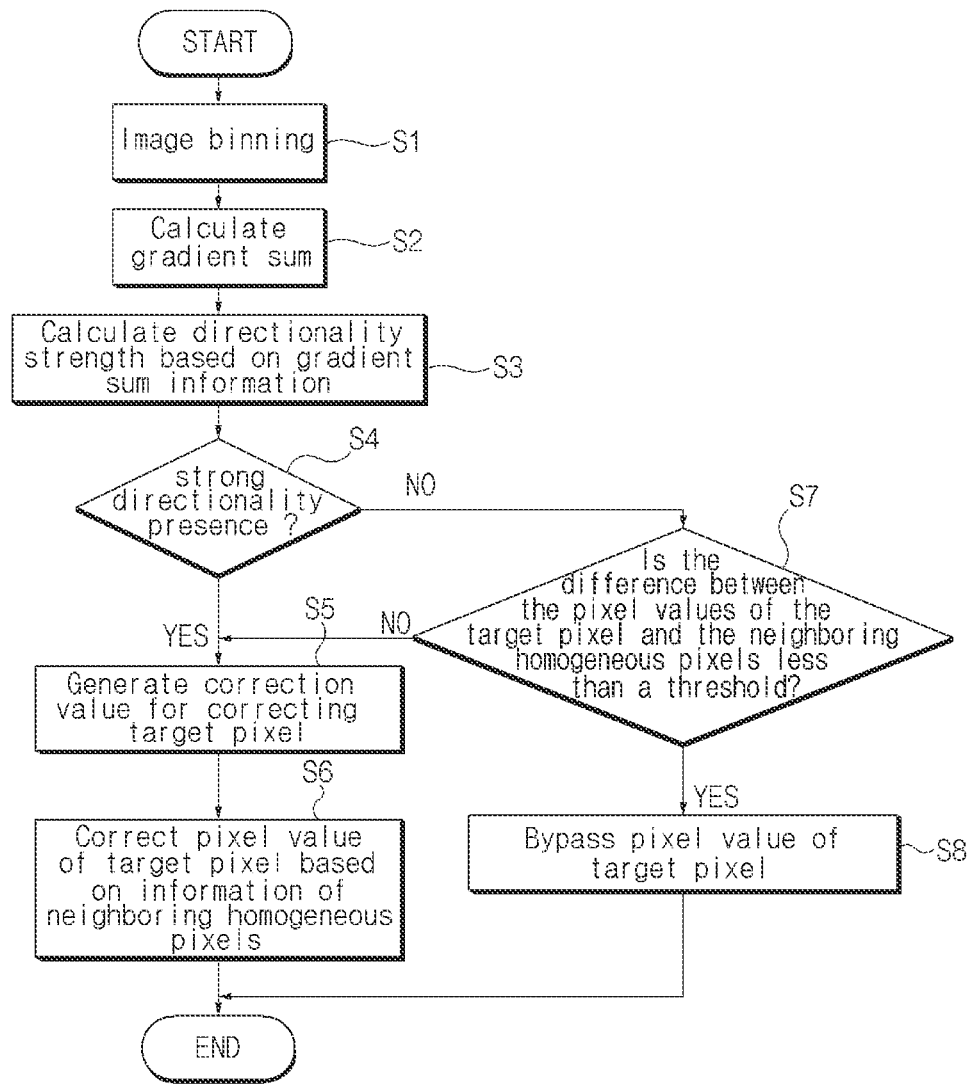
FIG. 3 is a schematic diagram illustrating an example of an image signal processing method based on some implementations of the disclosed technology.

FIG. 3 is a schematic diagram illustrating an example of an image signal processing method based on some implementations of the disclosed technology.

First, the image binning circuit 110 may output the second image (IMG2) by binning the first image (IMG1) as described above with reference to FIG. 2 (Operation S1). Here, the image binning circuit 110 may bin only the remaining color pixels except for the phase difference detection pixels.

Thereafter, the directionality strength determiner 120 may calculate a gradient sum (i.e., the sum of gradients) in a direction corresponding to the position of the target kernel in the second image IMG2 (Operation S2). A method for calculating the gradient sum will be described in more detail with reference to FIGS. 4 and 5 to be described later. Then, the directionality strength determiner 120 may calculate directionality strength information based on the gradient sum information (Operation S3).

The directionality strength determiner 120 may determine whether strong directionality exists in the calculated directionality strength (Operation S4). That is, the directionality strength determiner 120 may determine whether the target pixel is located in a region to be corrected (i.e., the edge region having specific directionality).

When the presence of strong directionality is determined, the directionality strength determiner 120 may determine that the target pixel is located in the region to be corrected. Here, the region to be corrected may refer to a high-frequency edge region having specific directionality. For example, the high-frequency edge region may refer to a region including a high-frequency signal and having an edge region. When the presence of strong directionality is determined, the correction value generator 140 may generate a correction value for correcting the target pixel (Operation S5).

Then, the corrector 150 may correct the pixel value of the target pixel based on the correction value received from the correction value generator 140 (Operation S6).

When the absence of strong directionality is determined in operation S4, the directionality strength determiner 120 may determine that the target pixel is located in a region not to be corrected. Here, the region not to be corrected may refer to a flat region, a complex texture region having no specific directionality, an end region of a pattern shape, and the like.

Accordingly, when the absence of strong directionality is determined in operation S4, the pixel value comparator 130 may determine whether a difference in pixel value between a target pixel and a neighboring pixel (hereinafter referred to as a neighboring homogeneous pixel) of the same type as the target pixel is less than a predetermined threshold (Operation S7). In an embodiment, when a difference in pixel value between the target pixel and the neighboring homogeneous pixel in a situation where there is no strong directionality is equal to or greater than a predetermined threshold, the target pixel should be corrected to prevent or mitigate distortion of the output image.

Therefore, when a difference in pixel value between the target pixel and the neighboring homogeneous pixel is equal to or greater than the predetermined threshold (Operation S7), the correction value generator 140 may generate a correction value for correcting the target pixel (Operation S5).

On the other hand, when a difference in pixel value between the target pixel and the neighboring homogeneous pixel is less than the predetermined threshold (Operation S7), the bypass circuit 141 may bypass the pixel value of the target pixel (Operation S8). That is, the bypass circuit 141 may output the pixel value of the target pixel to the corrector 150 without change.

Figure 4:
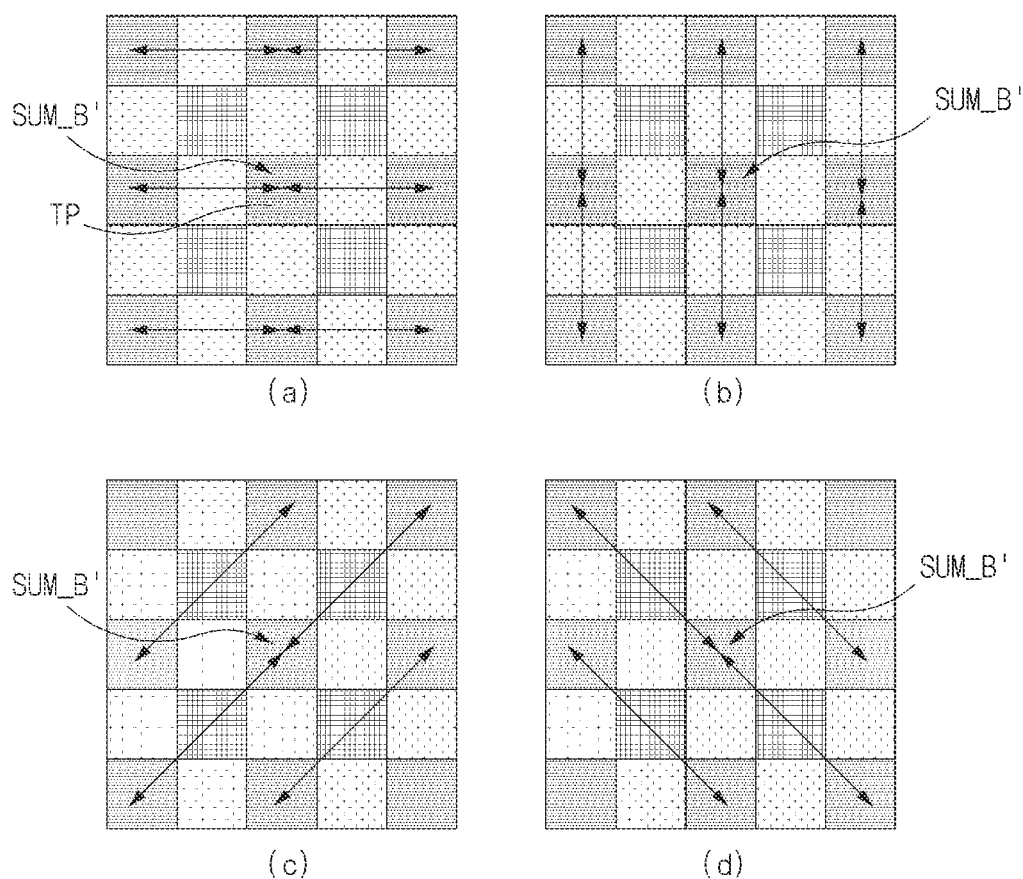
FIGS. 4 and 5 are schematic diagrams illustrating examples of a directionality strength calculation operation shown in FIG. 3 based on some implementations of the disclosed technology.
Figure 5:
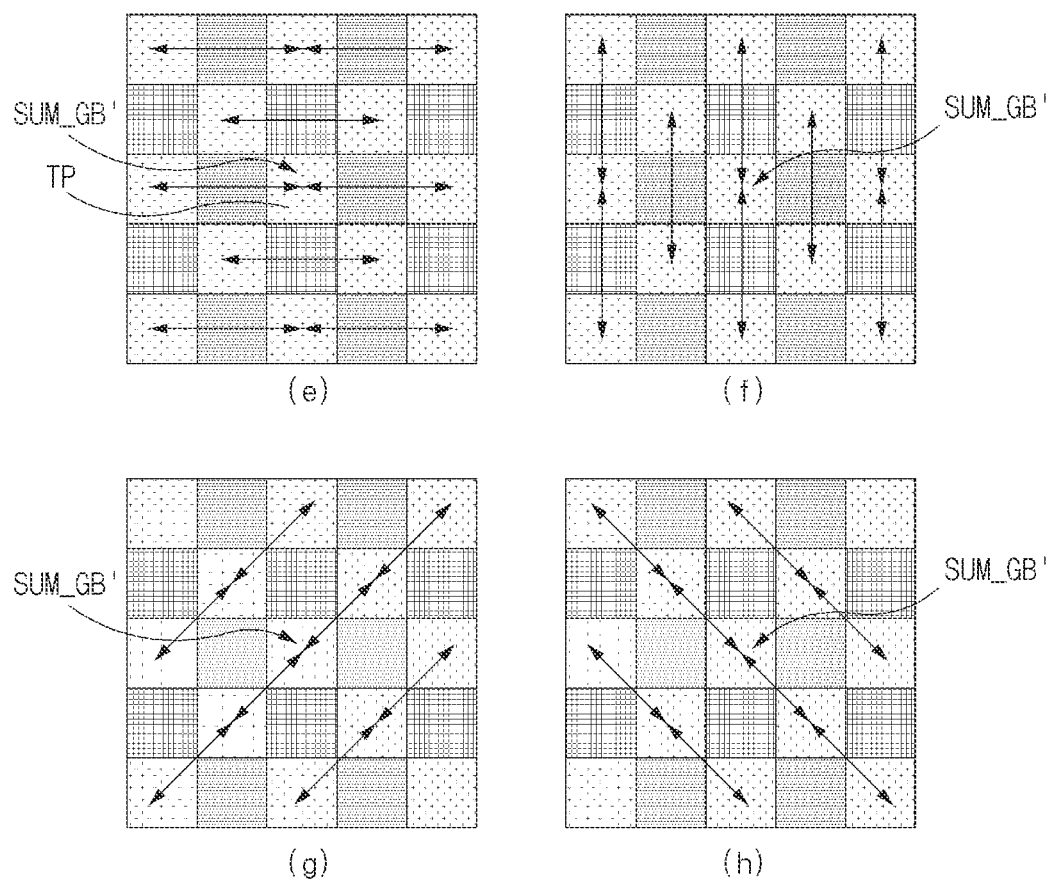

FIGS. 4 and 5 are schematic diagrams illustrating examples of a directionality strength calculation operation shown in FIG. 3 based on some implementations of the disclosed technology.

FIG. 4 illustrates a method for calculating a gradient sum when a pixel located at the center of the kernel is a blue pixel (e.g., a pixel (SUM_B') in the second image IMG2 of FIG.

2). FIG. 5 illustrates a method for calculating a gradient sum when a pixel located at the center of the image is a green pixel (e.g., a pixel (SUM_GB') in the second image IMG2 of FIG. 2).

In some implementations of the disclosed technology, it is assumed that directionality strength calculation and correction operations are performed in units of a (5×5) kernel having 5 rows and 5 columns. However, a kernel having another size other than the (5×5) size may also be used depending on performance of the image signal processor, required correction accuracy, an arrangement method of color pixels, and the like. A pixel located at the center of the (5×5) kernel may correspond to a target pixel TP to be corrected.

A method for determining basic in-kernel directionality may determine whether a texture exists in horizontal, vertical, and diagonal (slash and backslash) directions with respect to the entire target kernel. Here, the texture may refer to a set of pixels having similarity. For example, a subject having a unified color included in a captured scene may be recognized as a texture. However, it is impossible for such directionality determination to provide accurate information in a high-frequency region rather than a straight texture. Particularly, such directionality determination cannot provide accurate information in a bent or discontinuous texture pattern within a kernel, for example, in any of an edge texture that is cut in the middle, a texture boundary, and the like. For example, if directionality determination is performed for a kernel formed with "¬"-shaped edges, it is easy for such directionality to correspond to a backslash direction ('\'). Thus, if there is a target pixel (TP) at a bent position of the texture, the result of correcting the target pixel (TP) can remove the bent texture. As a result, the embodiment of the disclosed technology can determine the directionality using the half direction in the kernel. In FIGS. 4 and 5, both ends of each arrow may mean a difference between two pixel values.

The directionality strength determiner 120 may calculate a gradient sum in a direction corresponding to each position of the target kernel. The directionality strength determiner 120 may determine that, as the value of the gradient sum decreases, a target texture is more likely to be a texture arranged in the corresponding direction. That is, when the sum of gradients in one direction is at least N times smaller than the sum of the other gradients in the remaining directions, the directionality strength determiner 120 may determine that strong directionality exists in the corresponding direction.

Each of patterns shown in FIG. 4 may include blue pixels (B), red pixels (R), and green pixels (GB), and the target pixel (TP) may be the blue pixel (SUM_B'). For example, the directionality strength determiner 120 may obtain a gradient sum in four directions (i.e., four directions composed of a horizontal direction (a), a vertical direction (b), a slash direction (c), and a backslash direction (d)). In an embodiment, the directionality strength determiner 120 may obtain a gradient sum in four directions (i.e., four directions composed of a horizontal direction (a), a vertical direction (b), a slash or diagonal direction (c), and a backslash or diagonal direction (d) as shown in FIG. 4)).

Each of patterns shown in FIG. 5 may include blue pixels (B), red pixels (R), and green pixels (GB), and the target pixel (TP) may be the green pixel (SUM_GB'). For example, the directionality strength determiner 120 may obtain a gradient sum in four directions (i.e., four directions composed of a horizontal direction (e), a vertical direction (f), a slash direction (g), and a backslash direction (h)). In an embodiment, the directionality strength determiner 120 may obtain a gradient sum in four directions (i.e., four directions composed of a horizontal direction (e), a vertical direction (f), a slash or diagonal direction (g), and a backslash or diagonal direction (h) as shown in FIG. 5)).

That is, as shown in (a) and (e) of FIGS. 4 and 5, the gradient sum corresponding to the horizontal direction may be calculated. In other words, a gradient sum of the horizontal direction may be calculated by summing differences between pixel data values of pixels arranged in the horizontal direction.

As shown in (b) and (f) of FIGS. 4 and 5, the gradient sum corresponding to the vertical direction may be calculated. In other words, a gradient sum of the vertical direction may be calculated by summing differences between pixel data values of pixels arranged in the vertical direction.

As shown in (c) and (g) of FIGS. 4 and 5, the gradient sum corresponding to the slash direction ('/') may be calculated. In other words, a gradient sum of the slash direction may be calculated by summing differences between pixel data values of pixels arranged in the slash direction.

As shown in (d) and (h) of FIGS. 4 and 5, the gradient sum corresponding to the backslash direction ('\') may be calculated. In other words, a gradient sum of the backslash direction may be calculated by summing differences between pixel data values of pixels arranged in the backslash direction.

The gradient sum in each of the above-described four directions (i.e., the vertical direction, the horizontal direction, the slash direction, and the backslash direction) may represent the directionality strength for each direction. The directionality strength determiner 120 may compare the directionality strengths of the four directions with each other, and may thus determine the presence or absence of the direction having strong directionality based on the result of comparison in directionality strength.

Specifically, when the directionality strength for a specific direction having the strongest directionality strength from among the directionality strengths for the above four directions is higher than the directionality strength for each of the remaining directions by a threshold strength or greater, the directionality strength determiner 120 may determine the specific direction to be a direction having strong directionality. Conversely, when the directionality strength of a specific direction having the strongest directionality from among the directionality strengths for the above four directions is not higher than the directionality strength for each of the remaining directions by a threshold strength or greater, the directionality strength determiner 120 may determine the absence of a direction having strong directionality.

According to the embodiment of the disclosed technology, it is assumed that the edge patterns of the (5×5) kernel have any one of four directions for convenience of description, but the scope or spirit of the disclosed technology is not limited thereto, and it should be noted that edge patterns of more subdivided directions may exist in a kernel larger than the (5×5) kernel. The method for correcting defective pixels according to the embodiment of the disclosed technology can also be equally applied to the edge patterns of the subdivided directions as needed.

In addition, although the embodiment of the disclosed technology has disclosed that the target pixel (TP) and the neighboring homogeneous color pixels are used to calculate the gradient sum for convenience of description, other implementations are also possible, and the neighboring homogeneous color pixels might not be used as needed.

Figure 6:
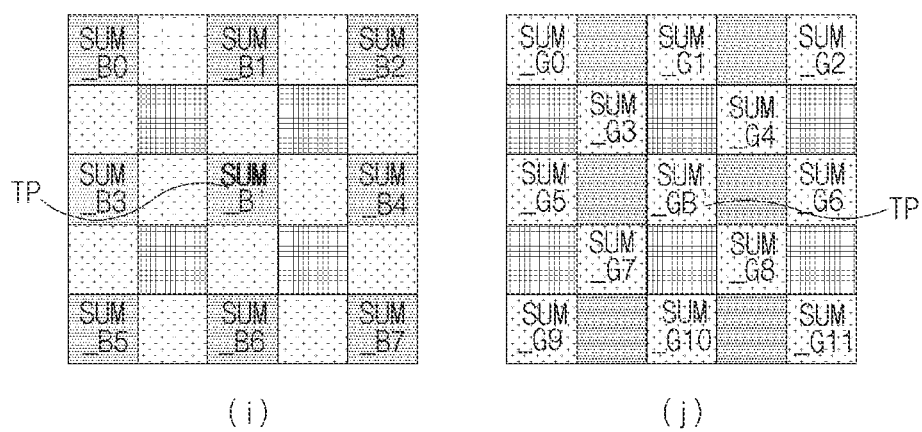
FIG. 6 is a schematic diagram illustrating an example of a correction operation shown in FIG. 3 based on some implementations of the disclosed technology.

FIG. 6 is a schematic diagram illustrating an example of the correction operation shown in FIG. 3 based on some implementations of the disclosed technology.

Referring to FIG. 6, the correction value generator 140 may generate a correction value for correcting the target pixel (TP), when the result of determination by the directionality strength determiner 120 indicates that the target pixel (TP) has specific directionality and the result of comparison by the pixel value comparator 130 indicates that a difference in pixel value between the target pixel (TP) and the neighboring homogeneous pixel is equal to or greater than a predetermined threshold or greater. Further, when the above-described two conditions are satisfied, the corrector 150 may correct the target pixel (TP) using an average pixel value of the neighboring same-color pixels based on directionality information.

As shown in (i) of FIG. 6, when the target pixel (TP) is a blue pixel (SUM_B'), a total of 8 pixels of the same color may be denoted by SUM_B0 to SUM_B7. For example, the target pixel (TP) may be corrected with an average pixel value of pixels SUM_B3 and SUM_B4 arranged in the horizontal direction. The target pixel (TP) may be corrected with an average pixel value of the pixel (SUM_B1) and the pixel (SUM_B6) in the vertical direction. The target pixel (TP) may be corrected with an average pixel value of pixels SUM_B2 and SUM_B5 in the slash direction. The target pixel (TP) may be corrected with an average pixel value of the pixel (SUM_B0) and the pixel (SUM_B7) arranged in the backslash direction.

As shown in (j) of FIG. 6, when the target pixel (TP) is a green pixel (SUM_GB'), a total of 12 neighboring homogeneous color pixels may be denoted by SUM_G0 to SUM_G11. For example, the target pixel (TP) may be corrected with an average pixel value of the pixels SUM_G5 and SUM_G6 arranged in the horizontal direction. The target pixel (TP) may be corrected with an average pixel value of pixels SUM_G1 and SUM_G10 arranged in the vertical direction. The target pixel (TP) may be corrected with an average pixel value of pixels SUM_G4 and SUM_G7 arranged in the slash direction. The target pixel (TP) may be corrected with an average pixel value of pixels SUM_G3 and SUM_G8 in the backslash direction.

As described above, when the target pixel (TP) is a blue pixel (SUM_B'), the corrector 150 may correct the value of the target pixel (TP) based on 8 neighboring homogeneous pixels, and when the target pixel (TP) is a green pixel (SUM_GB'), the corrector 150 may correct the value of the target pixel (TP) based on 12 neighboring homogeneous pixels.

As is apparent from the above description, the image signal processor and the image signal processing method based on some embodiments of the disclosed technology can prevent or mitigate false colors from occurring in a high-frequency region, and can increase the accuracy of correction of defective pixels or the like.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image signal processor comprising:
an image binning circuit configured to generate a second image by summing pixel values of color pixels in a first image including a pixel value of at least one phase detection pixel and the pixel values of the color pixels;
a directionality strength determiner configured to calculate directionality strength information based on a target pixel disposed at a center of a target kernel within the target kernel of the second image;
a pixel value comparator configured to compare the pixel value of the target pixel with pixel values of neighboring homogeneous pixels;
a correction value generator configured to generate a correction value for correcting the target pixel based on a result of calculating the directionality strength and a result compared by the pixel value comparator; and
a corrector configured to correct the target pixel based on the correction value,
wherein the correction value generator further includes:
a bypass circuit configured to bypass a pixel value of the target pixel when the directionality strength does not have specific directionality and a difference in pixel value between the target pixel and the neighboring homogeneous pixels is less than a predetermined threshold.

2. The image signal processor according to claim 1, wherein:
the image binning circuit is configured to perform a binning operation of summing a pixel values of in the first image in units of a sub-pixel array,
wherein the sub-pixel array includes the phase difference detection pixel and the color pixels.

3. The image signal processor according to claim 2, wherein:
in the first image, the sub-pixel array is configured to include N pixels corresponding to a sum of the phase detection pixel and the color pixels; and
in the second image, the target pixel is binned with (N-1) color pixels excluding the phase difference detection pixel (Here, N is a natural number greater than 0).

4. The image signal processor according to claim 1, wherein:
in the first image, the phase difference detection pixels are respectively located in different sub-pixel arrays having different colors.

5. The image signal processor according to claim 1, wherein:
the directionality strength determiner is configured to calculate the directionality strength information based on gradient sum information obtained by summing differences between pixel data values of pixel pairs arranged in each of a plurality of directions.

6. The image signal processor according to claim 5, wherein:
the directionality strength determiner is configured to determine that, as a value of a sum of gradients obtained from the gradient sum information decreases, specific directionality exists in a specific direction.

7. The image signal processor according to claim 5, wherein the directionality strength determiner is configured to:
calculate the gradient sum in horizontal, vertical, slash and backslash directions centered on the target pixel.

8. The image signal processor according to claim 1, wherein the directionality strength determiner is configured to:

determine that, when the directionality strength has specific directionality, the target pixel is located in a region to be corrected;

determine that, when the directionality strength does not have specific directionality, the target pixel is located in a region not to be corrected.

9. The image signal processor according to claim 8, wherein:

the region to be corrected is configured to include a high-frequency edge region.

10. The image signal processor according to claim 8, wherein:

the region not to be corrected is configured to include any one of a flat region, a texture region having no specific directionality, and an end region of a pattern shape.

11. The image signal processor according to claim 1, wherein the pixel value comparator is configured to:

determine whether the difference in pixel value between the target pixel and the neighboring homogeneous pixels is equal to or greater than the threshold.

12. The image signal processor according to claim 11, wherein the correction value generator is configured to:

generate the correction value when the directionality strength has specific directionality and the difference in pixel value between the target pixel and the neighboring homogeneous pixels is equal to or greater than the threshold.

13. The image signal processor according to claim 1, wherein:

the corrector is configured to correct a pixel value of the target pixel using neighboring homogeneous color pixels present in the target kernel.

14. An image signal processing method comprising:

generating a target pixel by binning color pixels that are obtained by excluding at least one phase difference detection pixel from a sub-pixel array including the phase difference detection pixel and the color pixels;

determining directionality strength information based on the target pixel located at a center of a target kernel;

comparing the pixel value of the target pixel with pixel values of neighboring homogeneous pixels; and correcting the target pixel when the directionality strength has specific directionality and a difference in pixel value between the target pixel and the neighboring homogeneous pixels is equal to or greater than a predetermined threshold, wherein the correcting the target pixel includes:

bypassing, with a bypass circuit, a pixel value of the target pixel when the directionality strength does not have specific directionality and the difference in pixel value between the target pixel and the neighboring homogeneous pixels is less than the threshold.

15. The image signal processing method according to claim 14, wherein the determining the directionality strength information includes:

calculating gradient sum information by summing differences between pixel data values of pixel pairs arranged in each of a plurality of directions; and calculating the directionality strength information based on the gradient sum information.

16. The image signal processing method according to claim 15, wherein the determining the directionality strength information includes:

determining that, as a value of a gradient sum obtained from the gradient sum information decreases, specific directionality exists in a specific direction.

17. The image signal processing method according to claim 15, wherein the calculating the gradient sum information includes:

calculating the gradient sum in a horizontal direction centered on the target pixel;

calculating the gradient sum in a vertical direction centered on the target pixel;

calculating the gradient sum in a slash direction centered on the target pixel; and calculating the gradient sum in a backslash direction centered on the target pixel.

18. The image signal processing method according to claim 14, wherein the determining the directionality strength information includes:

determining that, when the directionality strength has specific directionality, the target pixel is located in a region to be corrected; and determining that, when the directionality strength does not have specific directionality, the target pixel is located in a region not to be corrected.

* * * * *